(12) United States Patent
You et al.

(10) Patent No.: US 11,463,035 B2
(45) Date of Patent: Oct. 4, 2022

(54) CONTROL METHOD FOR SENSORLESS MOTOR (71) Applicants: HYUNDAI MOTOR COMPANY, Seoul (KR); KIA MOTORS CORPORATION, Seoul (KR)

(72) Inventors: Chang Seok You, Hwaseong-si (KR); Min Su Kang, Paju-si (KR); Sung Do Kim, Seoul (KR); Dong Hun Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 179 days.

(21) Appl. No.: 16/907,807

(22) Filed: Jun. 22, 2020

(65) Prior Publication Data

US 2021/0028734 A1  Jan. 28, 2021

(30) Foreign Application Priority Data

Jul. 22, 2019  (KR) .......... 10-2019-0088067

(51) Int. Cl.
*H02P 21/00* (2016.01)
*H02P 21/22* (2016.01)
*H01M 8/04746* (2016.01)
*H01M 8/04111* (2016.01)

(52) U.S. Cl.
CPC ......... *H02P 21/22* (2016.02); *H01M 8/04111* (2013.01); *H01M 8/04753* (2013.01)

(58) Field of Classification Search
CPC ............... H02P 21/22; H01M 8/04111; H01M 8/04753

USPC ...................................... 318/400.02
See application file for complete search history.

(56) References Cited

U.S. PATENT DOCUMENTS

| | | | | |
|---|---|---|---|---|
| 10,075,111 B2* | 9/2018 | Maekawa | ................ | H02P 6/18 |
| 2006/0125439 A1* | 6/2006 | Ajima | ................ | B60K 6/48 |
| | | | | 318/716 |
| 2009/0184678 A1* | 7/2009 | Son | ................ | H02P 21/32 |
| | | | | 318/801 |
| 2015/0207447 A1* | 7/2015 | Sato | ................ | H02P 6/17 |
| | | | | 318/400.11 |
| 2018/0131305 A1* | 5/2018 | Wang | ................ | H02P 6/04 |
| 2018/0167009 A1* | 6/2018 | Suzuki | ................ | H02P 6/17 |

(Continued)

*Primary Examiner* — Erick D Glass
(74) *Attorney, Agent, or Firm* — Morgan, Lewis & Bockius LLP (57) ABSTRACT A method of controlling a sensorless motor of an air compressor is provided to overcome the known problems of sensorless control methods and to improve control responsiveness. In various aspects of the present invention, a method of controlling a sensorless motor of an air compressor includes: performing a speed control for stopping a motor by a controller; determining a motor stopped state from an estimated motor speed while the speed control is performed by the controller; determining a rotor position estimated as a fixed position when the motor stopped state is determined by the controller; performing motor position control for moving the rotor position to the fixed position when the motor stopped state is determined; and starting sensorless control for driving the motor by setting the fixed position to an initial position when requesting a motor driving while the rotor position is maintained at the fixed position.

10 Claims, 9 Drawing Sheets

(56) References Cited

U.S. PATENT DOCUMENTS

| | | | |
|---|---|---|---|
| 2018/0202442 A1* | 7/2018 | Nakamoto | H02P 6/30 |
| 2018/0254722 A1* | 9/2018 | Umetsu | H02P 6/182 |
| 2019/0207543 A1* | 7/2019 | Lan | B60L 15/20 |

* cited by examiner

FIG. 7A
(d-axis current applied)

FIG. 7B
(d-axis current omitted)

CONTROL METHOD FOR SENSORLESS MOTOR

CROSS REFERENCE TO RELATED APPLICATION

The present application claims priority to Korean Patent Application No. 10-2019-0088067, filed Jul. 22, 2019, the entire contents of which is incorporated herein for all purposes by this reference.

BACKGROUND OF THE PRESENT INVENTION

Field of the Invention

The present invention relates to a method of controlling a sensorless motor of an air compressor, and more particularly, the present invention relates to an initial method of controlling a sensorless motor of an air compressor that can overcome the problems of known sensorless control methods and improve control responsiveness.

Description of Related Art

A fuel cell system applied to a hydrogen fuel cell vehicle, which is one type of eco-friendly vehicle, includes a fuel cell stack for generating electrical energy from an electrochemical reaction of reaction gas (i.e., hydrogen as fuel gas and oxygen as oxidant gas) and a hydrogen supply device configured for supplying hydrogen, which is fuel gas, to the fuel cell stack; an air supply unit that supplies oxygen-containing air to the fuel cell stack; a heat and water management system that controls an operating temperature of the fuel cell stack and performs water management functions; and a controller that controls an overall operation of the fuel cell system.

Figure 1:
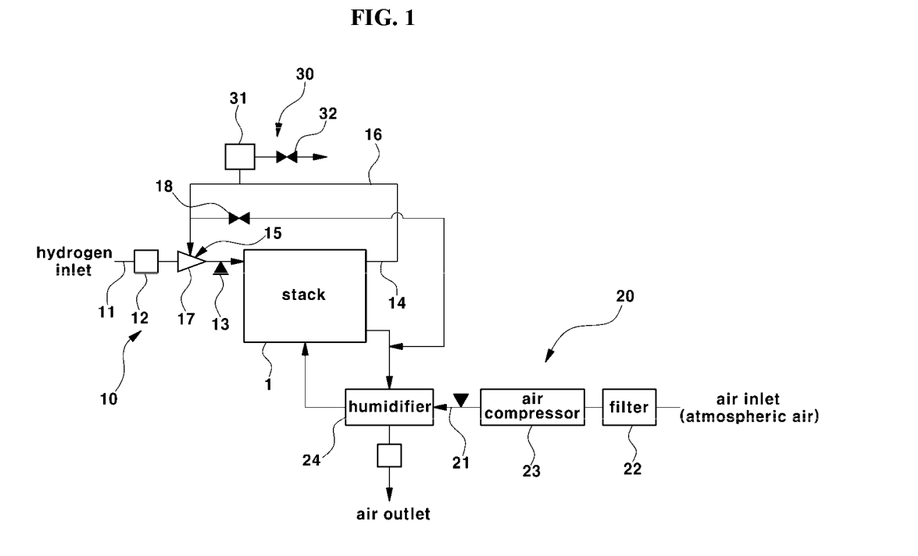
FIG. 1 is a schematic diagram illustrating a known fuel cell system.

FIG. 1 is a schematic diagram illustrating a known fuel cell system.

In the fuel cell system, the hydrogen supply device 10 includes a hydrogen storage unit (hydrogen tank), a regulator, a hydrogen supply line 11, a hydrogen pressure control valve (or referred to as "hydrogen supply valve") 12, a hydrogen pressure sensor 13, a hydrogen recirculation device 15 and the like.

Furthermore, the air supply device 20 includes an air supply line 21, a filter 22, an air blower or an air compressor 23, a humidifier 24, and the like, the heat and water management system 30 includes a water trap 31, a drain valve 32, and the like, together with an unillustrated electric water pump (cooling water pump), a water tank, a radiator, a three-way valve, and the like.

In relation to the hydrogen supply device 10 for supplying the hydrogen as fuel to the fuel cell stack 1, high pressure hydrogen supplied from the hydrogen tank in the hydrogen supply device 10 is supplied to the fuel cell stack 1 after decompressed to a constant pressure in the regulator.

The hydrogen decompressed in the regulator is supplied in a state in which a supply amount is controlled through a pressure control according to operation conditions of the fuel cell stack 1, and an opening amount of the hydrogen pressure control valve (fuel supply valve, FSV) 12 provided in the hydrogen supply line 11 is controlled according to a required output to supply a required amount of the hydrogen to the fuel cell stack 1.

At the present time, the controller (fuel cell control unit, FCU) receives a detecting value of the hydrogen pressure sensor 13 mounted in the hydrogen supply line 11 to control the hydrogen pressure and a hydrogen amount to control the opening amount of the valve 12.

Furthermore, unreacted hydrogen remaining after the reaction in the fuel cell stack 1 is discharged to outside through an anode (hydrogen electrode, fuel electrode) outlet end or recycled to a stack anode inlet end by the hydrogen recycle device 15.

A hydrogen recycling device 15 is directed to reuse the unreacted hydrogen and includes a recycling line 16 connected from an anode-outlet-side exhaust line 14 of the fuel cell stack 1 to the anode inlet side thereof.

Furthermore, a hydrogen recirculation device 15 includes an ejector 17, a recirculation blower, or the ejector and the recirculation blower which intake the unreacted hydrogen through a recirculation line 16 and supply the hydrogen to the fuel cell stack 1.

Accordingly, a purge valve 18 for an anode-side purge is mounted at an anode outlet side of the fuel cell stack 1. From the anode of the fuel cell stack 1 together with the hydrogen, the purge valve 18 is periodically opened or closed to exhaust and remove foreign substances such as nitrogen and water, increasing a hydrogen utilization rate.

Although not shown in the drawings, the controller FCU controls the opening amount of the hydrogen pressure control valve 12 to control hydrogen operating pressure, the air compressor 23, the air blower, and other valves in the system 18, 32.

Meanwhile, in recent years, a further improved performance of fuel cell vehicles has raised demand for the required output of fuel cells, which are power sources of the vehicles.

Accordingly, an air compression ratio in the air compressor 23 for supplying air to the fuel cell is being increased, and to this end, a maximum speed of driving the motor for air compression has to be boosted.

However, increasing the maximum speed of the motor in the air compressor 23 can cause the following problems.

The motor in the air compressor generates much heat when driving at a high speed that the motor necessarily requires cooling to lower a temperature of the motor due to its vulnerability to heat.

However, due to a limit to a cooling performance in the vehicle, the motor of the air compressor has the limit to lowering the temperature.

Furthermore, the air compressor includes a Hall sensor which is a position sensor for controlling a position of the motor, but vulnerable to heat.

Consequently, as described above, as a motor speed of the air compressor increases, the heat generated in the motor also increases. When using a Hall sensor, a certain situation having constraints may occur as the motor temperature increases.

For the present reason, the sensorless control technology needs to be secured and the Hall sensor requires removal. Mainly, the sensorless control utilizes a method of estimating a back electromotive force of the motor to estimate the position, the angle, and the speed of the motor.

However, the motor initially started does not generate the back electromotive force, leading to a problem that an initial position is unknown.

Due to the present problem, the back electromotive force-based sensorless control is performed after forming the motor speed by performing an open-loop control for several hundred ms at the time of an initial driving when resuming after the motor is stopped. However, as described above, performing open-loop control for several hundred ms may act as a weak point in the driving characteristics of the air compressor whose response is essential.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method for initial control of driving a sensorless motor of an air compressor to improve a control response and overcome the weak points of the conventional sensorless control methods.

In various aspects of the present invention, there is provided a method of controlling a sensorless motor of an air compressor, the method includes: performing a speed control for stopping the motor by a controller; determining a motor stopped state from an estimated motor speed according to a sensorless control logic while the speed control is performed by the controller; determining a rotor position of the motor estimated by the sensorless control logic as a fixed position at a time of determining the motor stopped state by the controller; performing a motor position control to move the rotor position to the fixed position when the motor stopped state is determined by the controller; and starting the sensorless control for driving the motor with the fixed position taken as an initial position when requesting the driving the motor in a state in which the rotor position of the motor is maintained at the fixed position by the controller.

Furthermore, the controller may be configured to determine the motor stopped state when the estimated motor speed reaches a reference speed predetermined according to the sensorless control logic in the determining the motor stopped state.

Furthermore, the reference speed may be set to the controller at a speed greater than 0 rpm.

Furthermore, in the performing the motor position control, the controller may apply q-axis current to the motor configured for moving the rotor position of the motor to the fixed position.

Furthermore, in the performing the motor position control, the controller may stop an application of the q-axis current when a predetermined reference time elapses after starting applying the q-axis current.

Furthermore, in the performing the motor position control, the controller may check whether a speed command of the motor is 0 rpm, and the q-axis current is applied when the reference time elapses while the speed command of the motor is 0 rpm.

Furthermore, the controller may be configured to generate and output a PWM signal to apply the q-axis current to the motor, and stop generating and outputting the PWM signal when the reference time elapses.

Furthermore, the air compressor may be an air compressor for a fuel cell system for supplying air to a fuel cell stack.

Thus, in accordance with the method of controlling a sensorless motor of an air compressor according to an exemplary embodiment of the present invention, the initial speed control responsiveness of the driving in the air compressor may be improved, and thus air supply responsiveness of the fuel cell stack, the stack output responsiveness, and vehicle acceleration performance may be improved.

Furthermore, when the driving is resumed after the motor is stopped, the speed control stability of an initial driving is ensured to avoid the application of torque at a meaningless position, improving the motor drive efficiency and improving the vehicle fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings so that those skilled in the art may easily implement the present invention. However, the present invention is not limited to the exemplary embodiments described herein and may be embodied in other forms.

When any part of the specification is to "include" any component, this means that it can further include other components without excluding other components unless otherwise stated.

The present invention relates to a method of controlling a sensorless motor, and more particularly, to provide a method of controlling a sensorless motor to overcome the problems of the conventional sensorless control method and to improve the control response.

The control method of the present invention may be used to control the sensorless motor of the air compressor, where the air compressor may be the air compressor (refer to '23' in FIG. 1) that supplies air into the fuel cell stack (refer to '1' in FIG. 1) in the fuel cell system.

In the following description, the motor means the motor of the air compressor, the speed of the air compressor means the motor speed, and the position and angle of the motor mean the rotation position and rotation angle of the rotor in the motor.

Furthermore, in the following description, braking means motor braking to stop the motor, and position alignment means aligning and fixing the rotor position to a predetermined position.

First, a brief description of known sensorless control will be briefly described to help understand the present invention.

Figure 2:
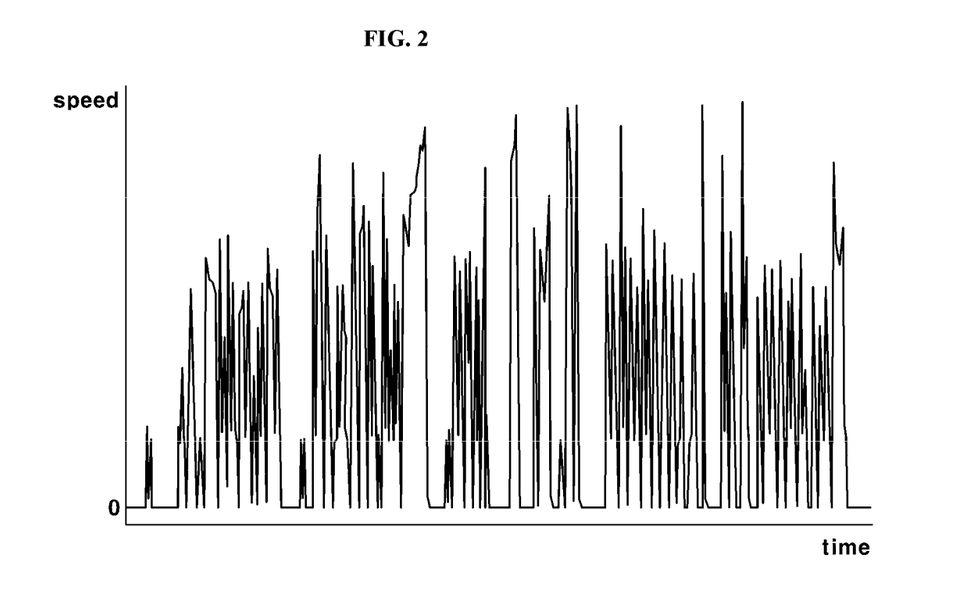
FIG. 2 is a diagram illustrating a speed acceleration/deceleration graph of a general air compressor when driving a fuel cell vehicle.

FIG. 2 is a diagram illustrating a speed acceleration/deceleration graph of a general air compressor. As shown in FIG. 2, the speed of the air compressor repeats sudden acceleration/deceleration according to the driving pattern of a driver.

Furthermore, the speed control responsiveness of the air compressor determines the air supply responsiveness of the fuel cell stack, which plays an important role as a factor in the response performance of the stack output.

Accordingly, the response performance of the stack output determines the acceleration performance of the vehicle, the speed control responsiveness of the air compressor becoming a very important factor while driving of the fuel cell vehicle.

Referring to FIG. 2, the present drawing gives understanding that the acceleration/deceleration of the air compressor occurs very frequently during operation, and the driving of the motor of the air compressor is stopped and resumed repeatedly.

That is, a short moment when the driving of the motor is stopped and then resumed may be referred to as the initial driving state of the motor, and such state occurs very frequently during the operation.

As shown in FIG. 2, when the motor speed of the air compressor is controlled by the acceleration/deceleration pattern, a situation in which the motor is stopped and the driving is resumed occurs frequently. In the instant case, the open-loop control is performed at each initial driving time when resuming the driving.

Figure 3:
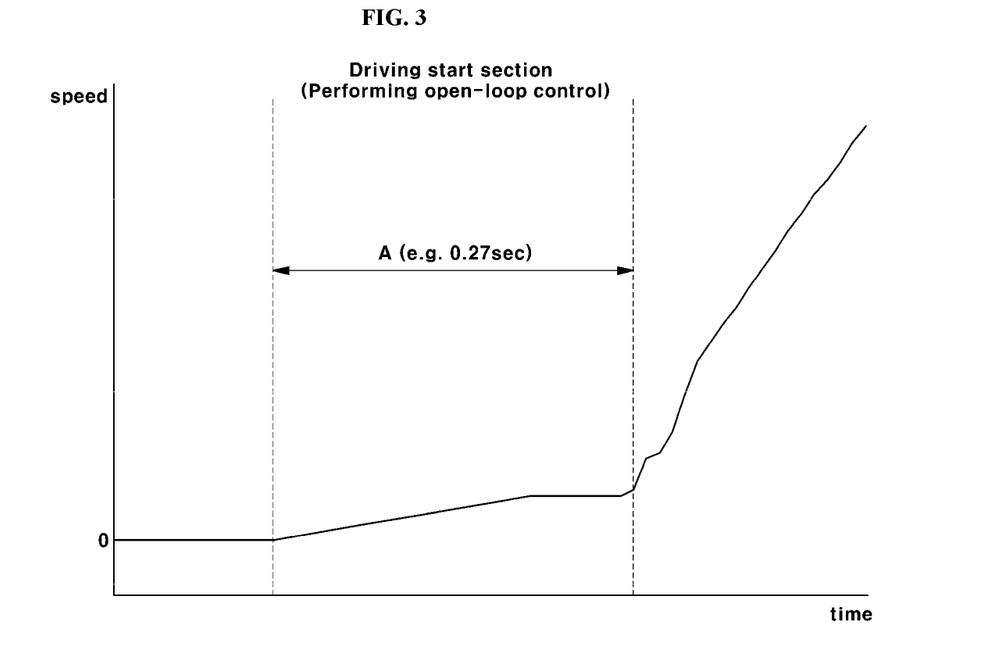
FIG. 3 is a diagram illustrating an initial open-loop control and a motor speed graph while driving in a known control process.

When the sensorless control takes control using the known back electromotive force, the speed control at the initial driving of the motor is shown as in FIG. 3.

FIG. 3 is a diagram illustrating an initial open-loop control and a motor speed graph while driving in a known control process. In the air compressor and a control system without the Hall sensor (position sensor), the open-loop control for the motor is started in the stopped state at the time of starting the motor as shown in FIG. 3.

The existing sensorless control logic alone makes an estimation of the initial position of the motor impossible because there is no back electromotive force to be formed, when the motor is stopped. Therefore, without the Hall sensor for detecting the motor position, the open-loop control needs to be performed at the time of starting the motor.

That is, in the sensorless control logic in which the position and speed of the motor is estimated using the back electromotive force of the motor, the estimation of the motor position is applicable only when the motor is driven to reach a constant motor speed. For the present reason, when resuming the driving of the motor, a magnetic field is formed at an arbitrary position in the initial stopped state of the motor so that the rotor of the motor is rotated by the magnetic field and a certain level of motor speed is secured.

In FIG. 3, 'A' represents the time of the driving start section where the driving of the motor starts, and the open-loop control for the motor and the initial driving of the motor are performed in an 'A' section. In FIG. 3, the open-loop control is performed for 0.27 seconds to achieve stability at the initial driving of the motor.

Referring to FIG. 3, it may be seen that after the 'A' section, the motor speed rises sharply due to the successful driving of the motor.

In the present way, when the driving of the motor of the air compressor starts from the stopped state of the sensorless system, the open-loop control is performed for the motor to reach a certain level of motor speed, but only for an initial short time.

As an example, in a stopped state, an open-loop control takes an average of 0.27 seconds, causing a driving delay as long as the time used for the open-loop control after initiating a command of the driving of the motor.

The responsiveness criterion of the air compressor is less than one second to reach the maximum speed (e.g., 100,000 rpm), so that the open-loop control and drive delay for 0.27 seconds hinders the response performance of about 30%.

FIG. 4A, FIG. 4B, FIG. 4C, and FIG. 4D are diagrams of a comparative example illustrating a motor speed graph when the open-loop control is omitted at the initial driving of the motor, showing a problem when the open-loop control is omitted.

FIG. 4A, FIG. 4B, FIG. 4C, and FIG. 4D illustrate a case in which the motor speed control is performed by directly performing sensorless control logic with omitting the open-loop control which is a response suppression factor.

Figure 4A:
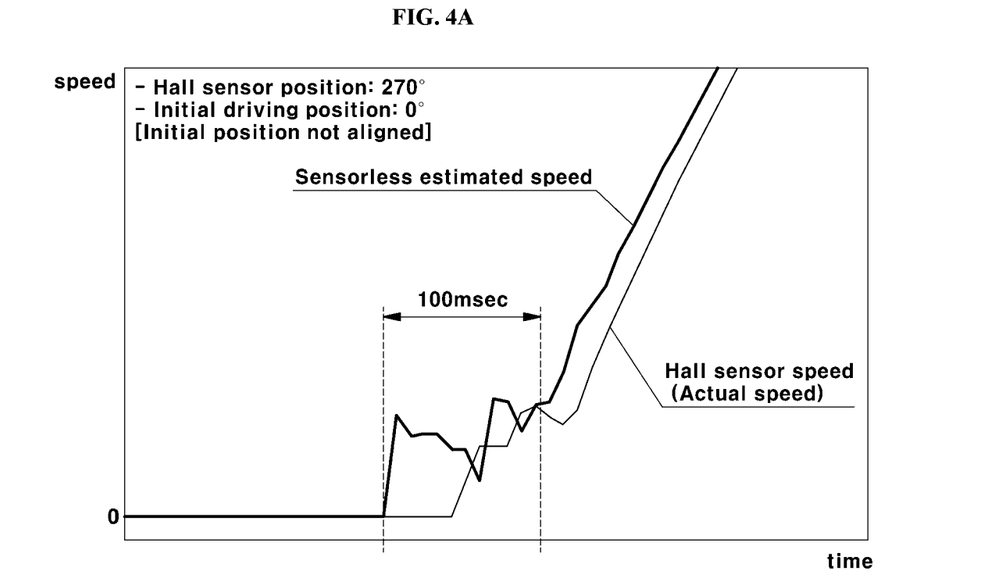
FIG. 4A, FIG. 4B, FIG. 4C, and FIG. 4D are diagrams of comparative examples illustrating motor speed graphs when the open-loop control is omitted at the initial driving of the motor.
Figure 4B:
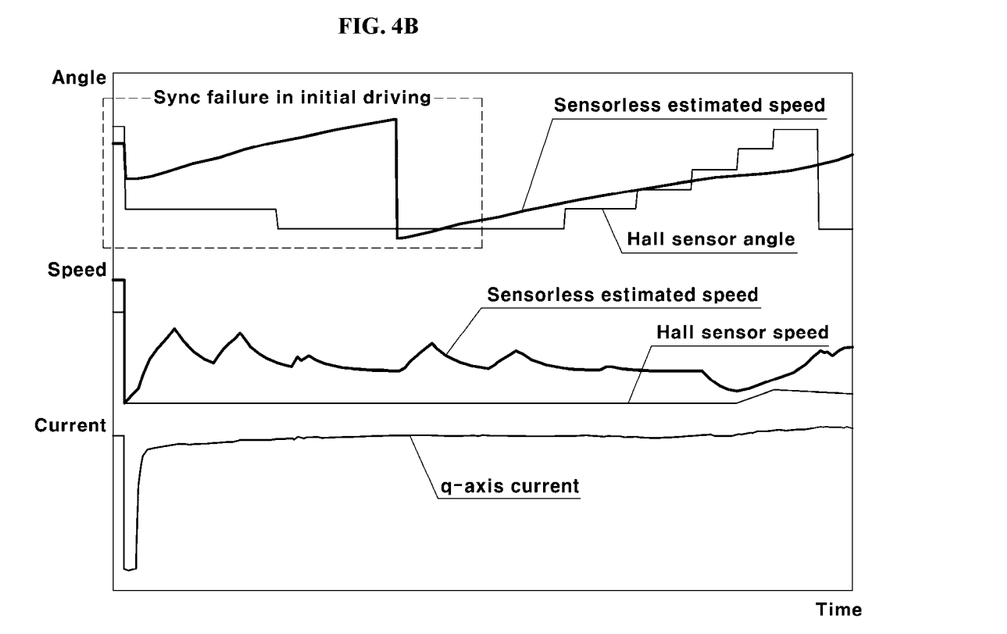

As in the example of FIG. 4A and FIG. 4B, when sensorless control logic is performed immediately without knowing the initial position of the driving, oscillation which is speed instability can occur for 100 ms, and the desired speed control may be started after the speed oscillation occurs for that short time.

Since the torque is applied by generating the magnetic field from the position irrespective of the rotor position, the synchronization of the driving of the rotor fails. Because of the present reason, the rotor does not run while the magnetic field is spinning one round, and the estimated speed by the sensorless control logic shows a noise value.

Figure 4C:
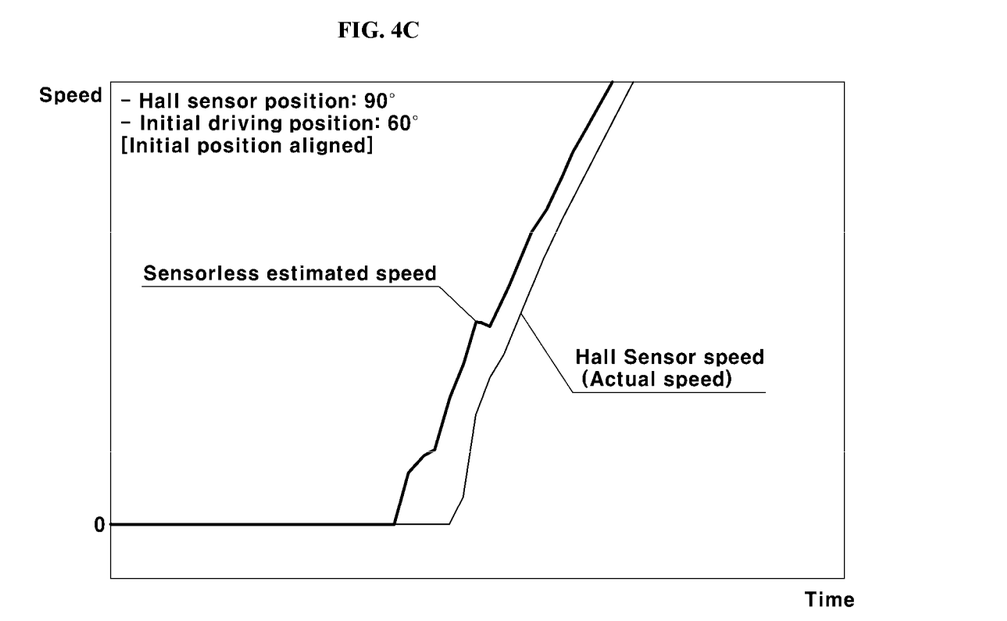
Figure 4D:
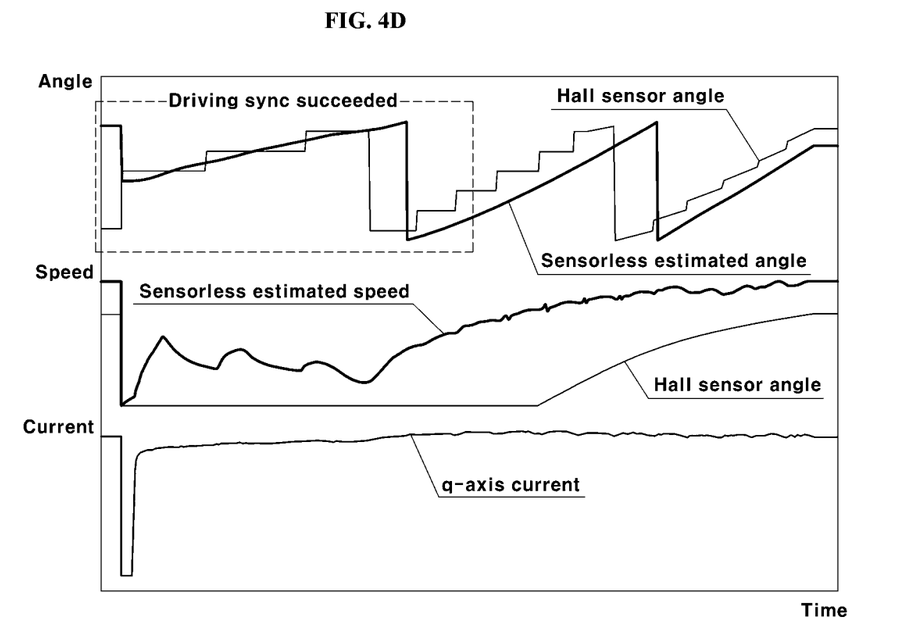

When a separate Hall sensor is disposed for testing, and the speed is controlled by performing the sensorless control logic in which an initial position is known by use of the Hall sensor, the speed control is directly performed without speed instability as in the example of FIGS. 4C and 4D.

In the instant case, since the torque is applied by generating a magnetic field from the initially known physical position of the rotor, the rotor may be synchronized instantly, thus speed control may be started.

Therefore, to estimate or know the initial position of the rotor is significantly important in sensorless control.

Hereinafter, a sensorless motor control method for an air compressor according to an exemplary embodiment of the present invention will be described in detail.

Sensorless motor control for an air compressor according to an exemplary embodiment of the present invention is performed by the controller, and all of the control process described below may be performed by the controller.

Furthermore, the controller configured for performing sensorless motor control according to an exemplary embodiment of the present invention may be an ordinary controller which is performing the motor control of the air compressor in the fuel cell system.

In an exemplary embodiment of the present invention, the sensorless motor refers to the motor without the Hall sensor for detecting the position and speed of the rotor.

Because of no Hall sensor in the sensorless motor, after estimating the position and speed of the rotor in a predetermined manner, the sensorless control may be performed using the estimated value to control the driving.

Figure 5:
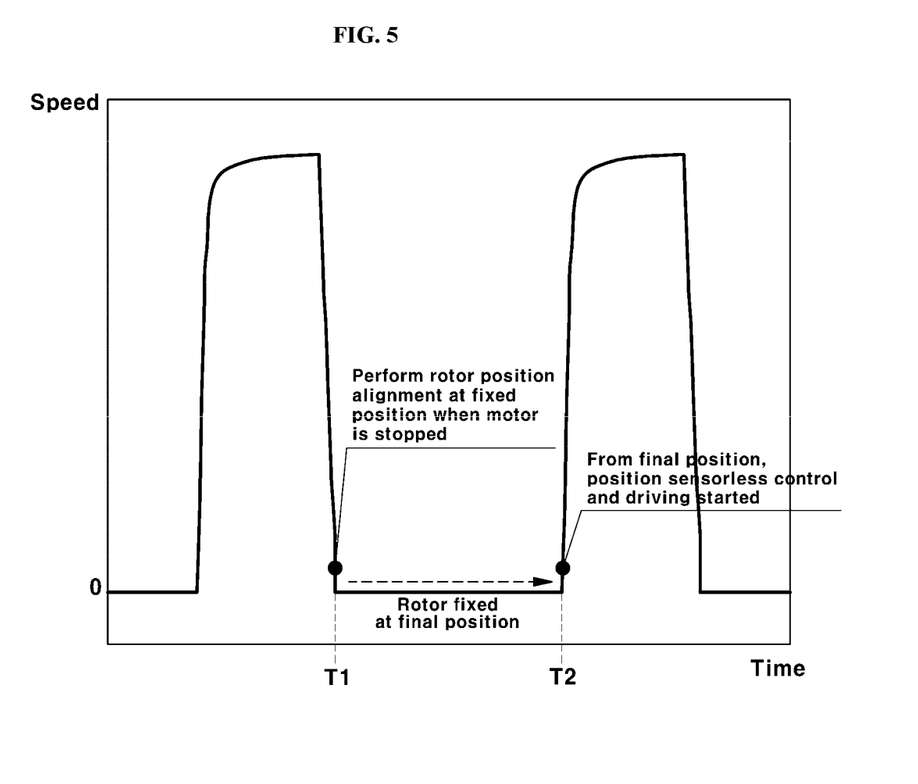
FIG. 5 is a block diagram illustrating a known fuel cell system according to an exemplary embodiment of the present invention.

Because of no Hall sensor in the sensorless motor, the initial position is not known in the stopped state of the motor, thus a method for overcoming the present problem is shown in FIG. 5.

To overcome the conventional problem, in an exemplary embodiment of the present invention, the process of aligning the rotor position is performed as shown in FIG. 5 so that the rotor may be at a predetermined angle and position in the motor stop process.

In an exemplary embodiment of the present invention, when the motor is stopped, the rotor is fixed in a state in which the angle and position of the rotor are aligned. Then at the initial driving of the motor in which the motor speed control is restarted, sensorless control and speed/current control are performed immediately from that position by use of the information related to the angle and position of the rotor fixed after the alignment as the initial angle and position.

Referring to FIG. 5, the 'T1' is a time point at which the motor is stopped (hereinafter referred to as a 'motor stop time'), and the 'T2' is a time point at which the driving of the motor is resumed and the sensorless control starts again (hereinafter, referred to as 'drive restart time').

As shown, the present invention performs rotor position alignment to control the rotor to be fixed at a predetermined position when the motor is stopped.

Thus, in an exemplary embodiment of the present invention, the rotor is fixed at a predetermined position in a state in which the rotor is aligned after the motor is stopped.

Here, as will be described later, the predetermined position may be a rotor position estimated according to the sensorless control logic. The estimation occurs when the controller is configured to determine a motor stopped state that satisfies a predetermined condition.

After the motor is stopped, the rotor is fixed at the final position aligned in the motor stop process until the driving of the motor is resumed.

After the motor restarts again, the initial position of the rotor at the time when the sensorless control is restarted becomes the final position of the rotor fixed after being aligned in the motor stop process, and the sensorless control starts from the final position at the time of resuming the driving.

That is, the next driving of the motor and sensorless control is performed with the final position which is the position of the aligned rotor in the previous motor stop process, as the initial position.

Figure 6:
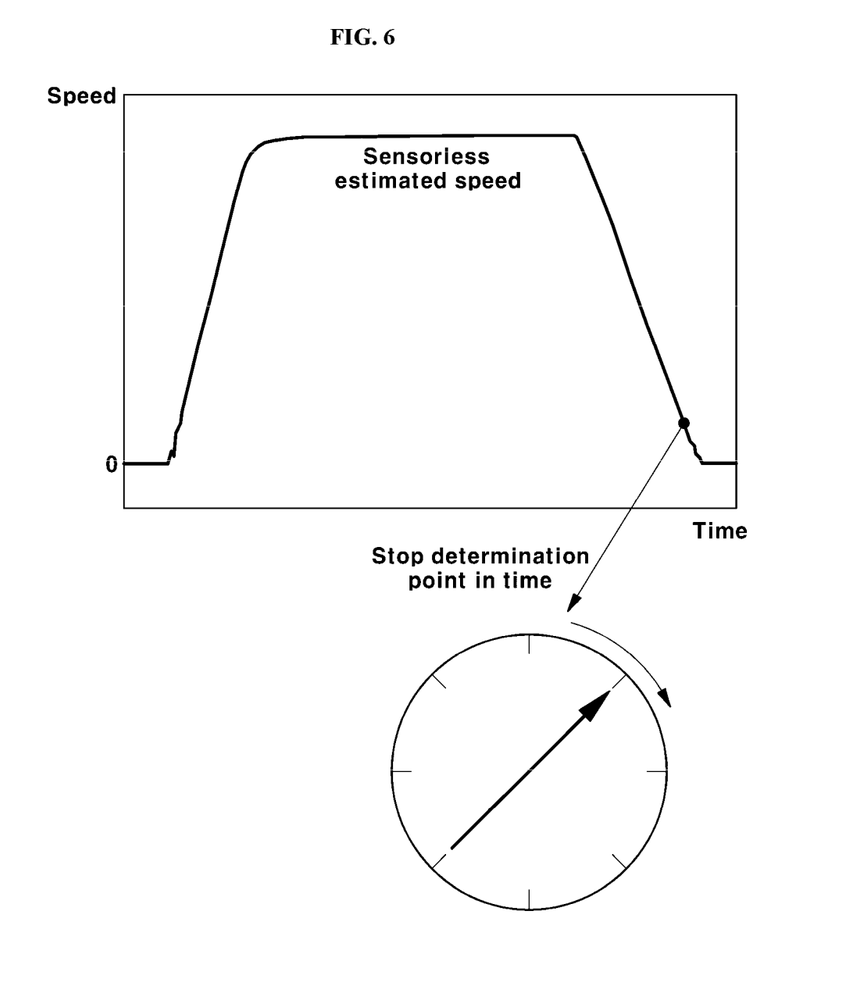
FIG. 6 and FIG. 7A are views for explaining a rotor position alignment method performed when the motor is stopped for controlling the sensorless motor according to an exemplary embodiment of the present invention.
Figure 7A:
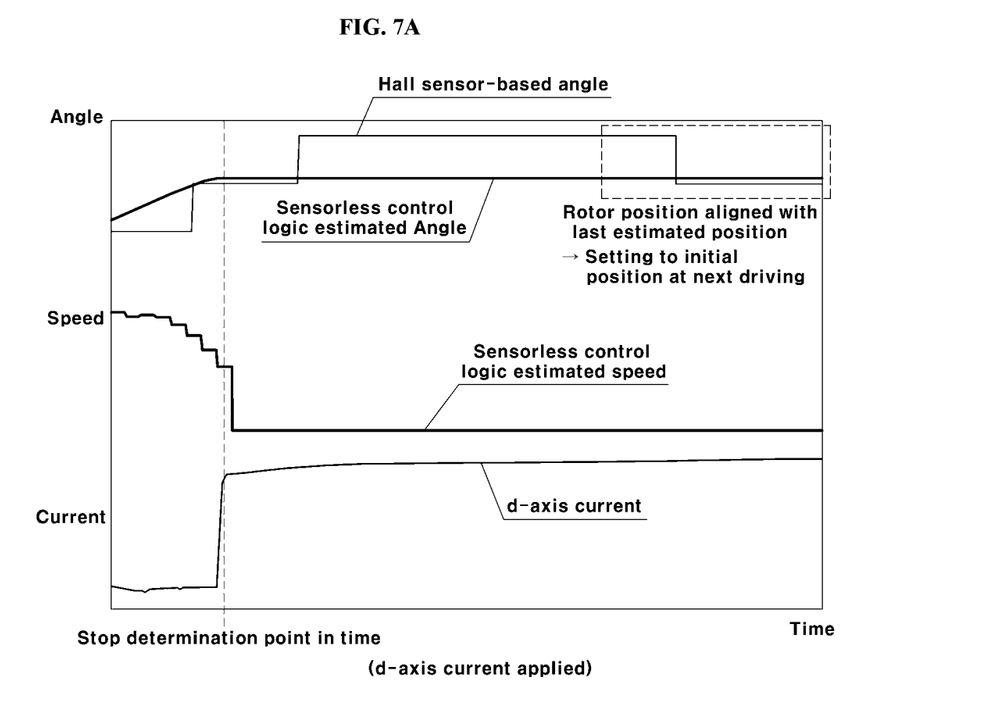
Figure 7B:
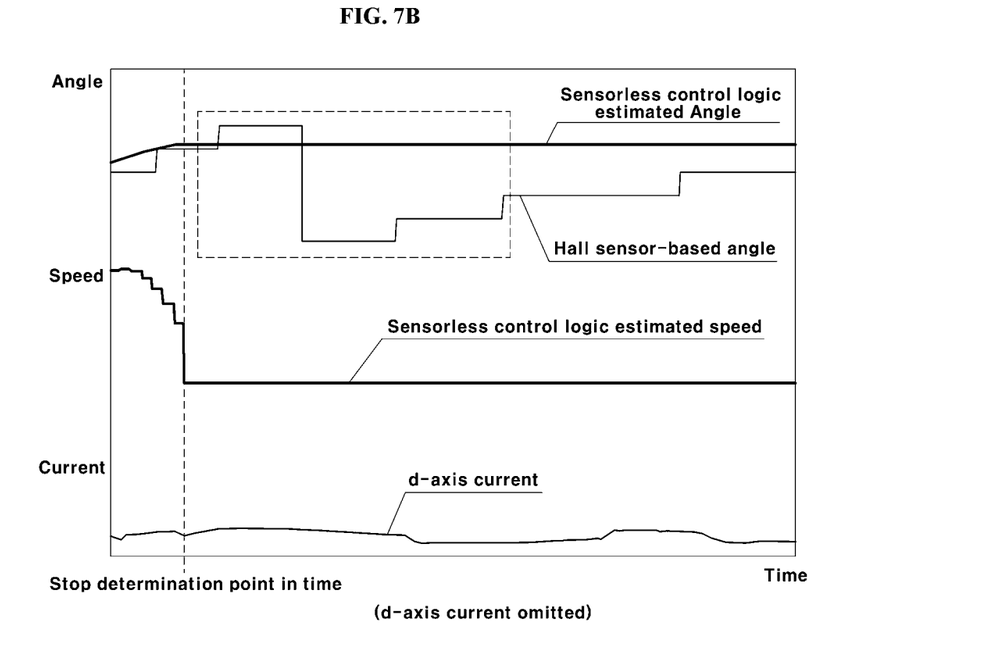
FIG. 7B is a diagram of a comparative example where d-axis current is not applied.

FIG. 6 and FIG. 7A are diagrams of an exemplary embodiment for explaining a rotor alignment method performed when the motor is stopped for controlling the sensorless motor according to an exemplary embodiment of the present invention, and FIG. 7B is a diagram of the comparative example showing d-axis with no applied current.

In FIG. 6, the diagram on the left shows the motor speed while controlling the motor speed after starting the motor, wherein the motor speed is increased (accelerated) and then maintained at a constant speed, and then the motor speed is lowered (decelerated) again until the motor is stopped.

In an exemplary embodiment of the present invention, when the motor speed reaches a predetermined reference speed while the controller lowers the motor speed to a predetermined speed for stopping the motor, the motor is determined to be in a stopped state. At the time when the motor is in the determined stopped state, the rotor position estimated last by the sensorless control logic is determined as the fixed position.

Here, the reference speed may be determined as a positive (+) speed greater than 0 rpm.

Next, as shown in the diagram on the right of FIG. 6, the d-axis phase current for controlling the rotor position to the fixed position is applied to the motor so that the rotor of the motor is fixedly positioned at the fixed position which is the rotor position at the time of determining motor stop. Thus, the rotor position is fixed to the fixed position.

At the present time, d-axis current for moving and fixing the rotor to the fixed position is applied for a predetermined reference time, and the rotor position is moved and fixed to the fixed position by the magnetic field generated by applying current to the d-axis.

After fixing the rotor, the controller stops all the PWM signal generation and the PWM control process of the output so that the state of the motor stop is maintained until the driving of the motor is resumed.

FIG. 7A illustrates a state in which the rotor position alignment is performed as in an exemplary embodiment of the present invention, and FIG. 7B illustrates a state in which the rotor position alignment is not performed.

FIG. 7B illustrates a state in which the rotor is rotated by inertia.

Since the present invention is applied to a sensorless motor, the motor does not actually have the Hall sensor (position sensor), but rotor angles (Hall sensor-based angles) obtained from signals of a separate Hall sensor are shown in FIG. 7A and FIG. 7B for testing purposes.

As described above, the 'Hall sensor-based angle' in FIG. 7A and FIG. 7B may be understood as representing the actual position and angle of the rotor.

Referring to FIG. 7A, as shown in an exemplary embodiment of the present invention, the figure shows that the state of the rotor position alignment is made by applying the d-axis current in the motor stop process, and the d-axis current is applied at the time of determining the stop before the motor speed reaches 0 rpm.

Furthermore, by applying the d-axis current, it may be seen that the position and angle of the rotor after the motor is stopped are fixed and moved to the fixed position which is finally estimated at the time of determining the motor stop in the sensorless control logic (See Hall sensor-based angles).

As in the exemplary embodiment shown in FIG. 7A, when the controller is configured to generate and outputs a PWM signal and applies currents to d-axis without blocking the PWM signal immediately when the motor is stopped, as shown from the information related to the Hall sensor signal angle (Hall sensor-based angle), it is possible to align the rotor position with the last estimated position (the fixed position) by the sensorless control logic when the motor is stopped.

On the other hand, referring to FIG. 7B, there is a rotation of the rotor when the d-axis current is not applied unlike the present invention during the motor stop process (refer to the rectangular portion of the dotted line).

That is, with the angle information (Hall sensor-based angle) acquired from the signal of the Hall sensor (position sensor), the rotor rotates by inertia even when the current is not applied after the PWM blocking, changing the position of the rotor. After the present rotation of the rotor continues to some extent, the rotor stops at an unknown position.

In an exemplary embodiment of the present invention, by applying currents to the d-axis during the motor stop process, the rotor position and angle are aligned with the lastly estimated rotor position (the fixed position) and angle when the motor is stopped by the sensorless control logic, and then the rotor position is fixed to the above-aligned position in the stopped state.

Afterward, when the driving of the motor starts, the sensorless control without the open-loop control immediately starts with the above-aligned rotor position, that is, the fixed position as the initial position, at the time of restarting the driving (it is 'T2' in FIG. 5). In the present way, the driving delay may be eliminated as in the related art and the motor control and the responsiveness of the driving may be improved.

Figure 8:
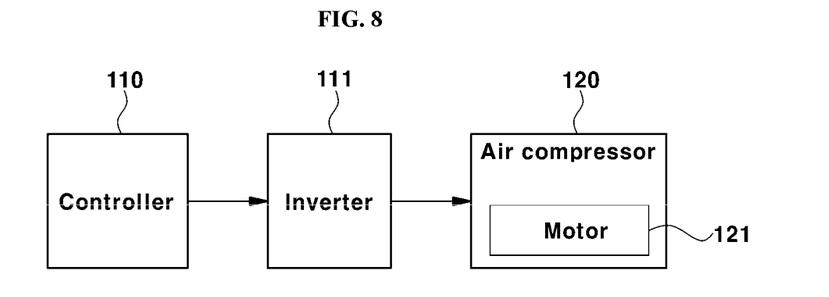
FIG. 8 is a schematic block diagram of a system for performing a sensorless motor control process according to an exemplary embodiment of the present invention.
Figure 9:
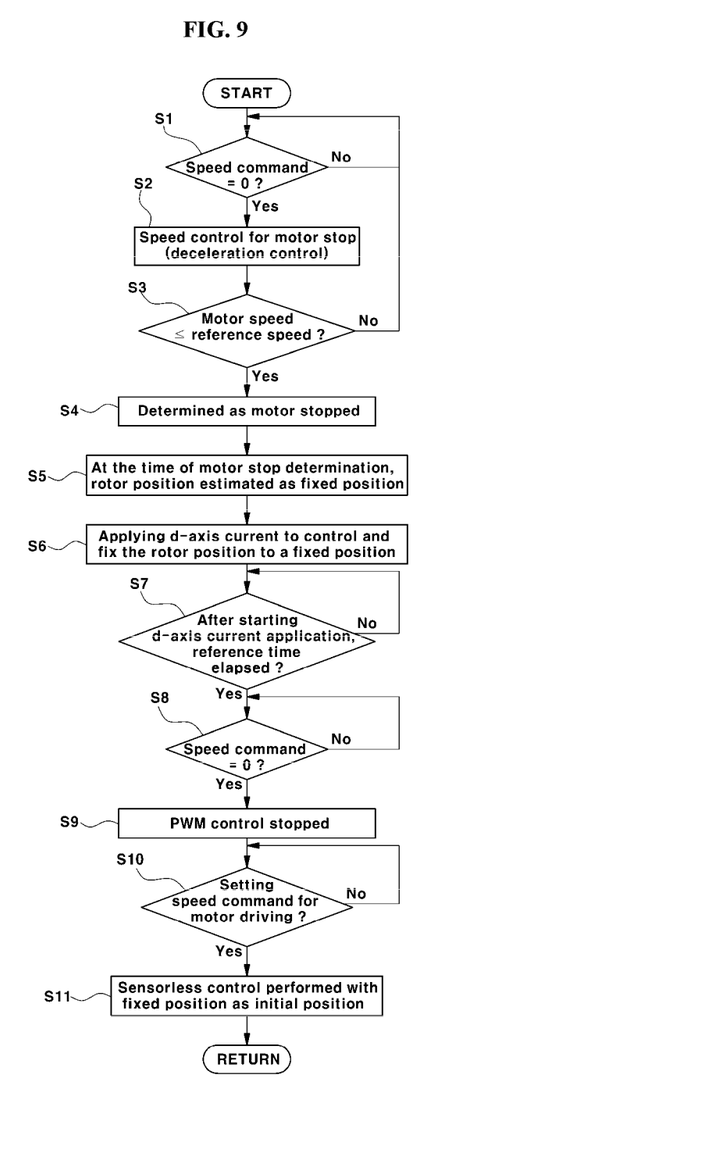
FIG. 9 is a flowchart illustrating a sensorless motor control process of the air compressor according to an exemplary embodiment of the present invention.

FIG. 8 is a schematic block diagram of a system for performing a process of the sensorless motor control according to an exemplary embodiment of the present invention, and FIG. 9 is a flowchart illustrating a process of the sensorless motor control of an air compressor according to an exemplary embodiment of the present invention.

Describing the control process referring to the above figures, firstly, the controller 110 determines whether the speed command of the motor is set to a command value for stopping the motor, for example, a command value of 0 rpm (S1), and when it is determined that the speed command is set to the command value of 0 rpm, the motor speed is lowered by performing a normal sensorless deceleration control (S2).

After the controller 110 compares the motor speed estimated by the sensorless control logic with a predetermined reference speed (rpm) (S3), when the motor speed reaches or falls below the reference speed, it is determined that the motor stop has reached (S4).

The controller 110 determines the rotor position estimated by the sensorless control logic as the fixed position at the time of determining the motor stop (S5).

Accordingly, the controller 110 applies the d-axis current to the motor to control and fix the rotor position of the motor 121 to the determined fixed position (S6). To the present end, the controller is configured to generate and outputs a PWM signal to apply the d-axis current to the motor 121.

After all, as the controller 110 generates and outputs a PWM signal, the d-axis current for aligning and fixing the rotor position is applied to the motor 121 of the air compressor 120 through the inverter 111. When the d-axis current is applied in the present way, the rotor position of the motor 121 is aligned and fixed to the fixed position.

The controller 110 determines whether the reference time has elapsed since the start of applying the d-axis current (S7), and when the reference time has elapsed, checks again whether the speed command is a command value of 0 rpm (S8), and accordingly, stops the PWM control (S9).

Afterward, when the driving of the motor is requested, the speed command for the driving of the motor is set and the driving of the motor restarts (S10). In the initial of the driving of the motor, the controller 110 utilizes the rotor position (the fixed position) and the angle information which are aligned at the time of the last stopping of the motor as the initial position and angle to perform both the sensorless control and the motor speed/current control for driving the motor 121 from the position, on the basis of the speed command (S11).

Figure 10A:
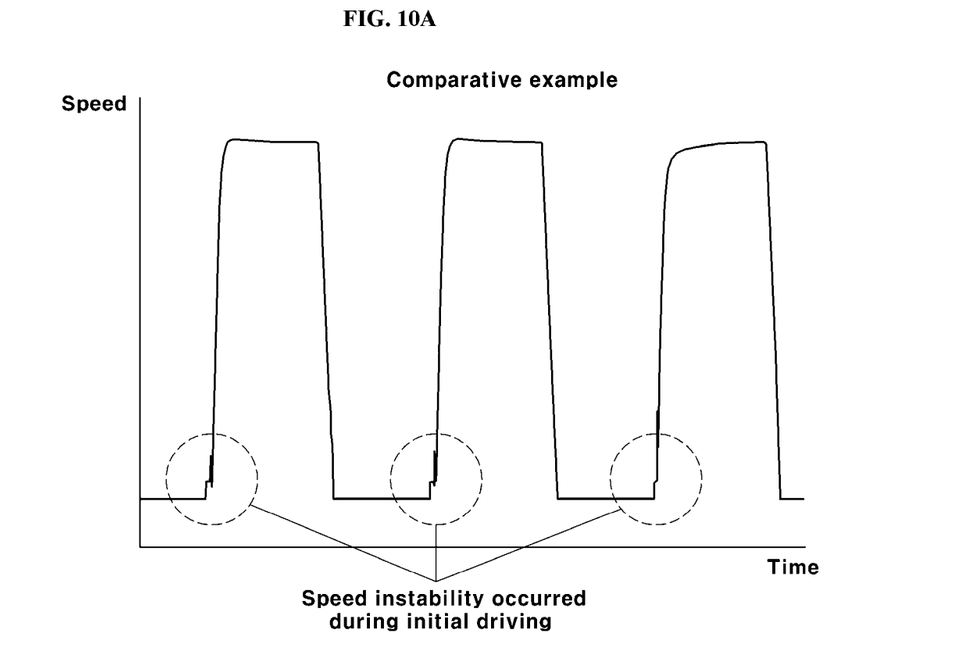
FIG. 10A and FIG. 10B are diagrams illustrating speed graphs of the comparative example and the exemplary embodiments of the present invention, respectively.
Figure 10B:
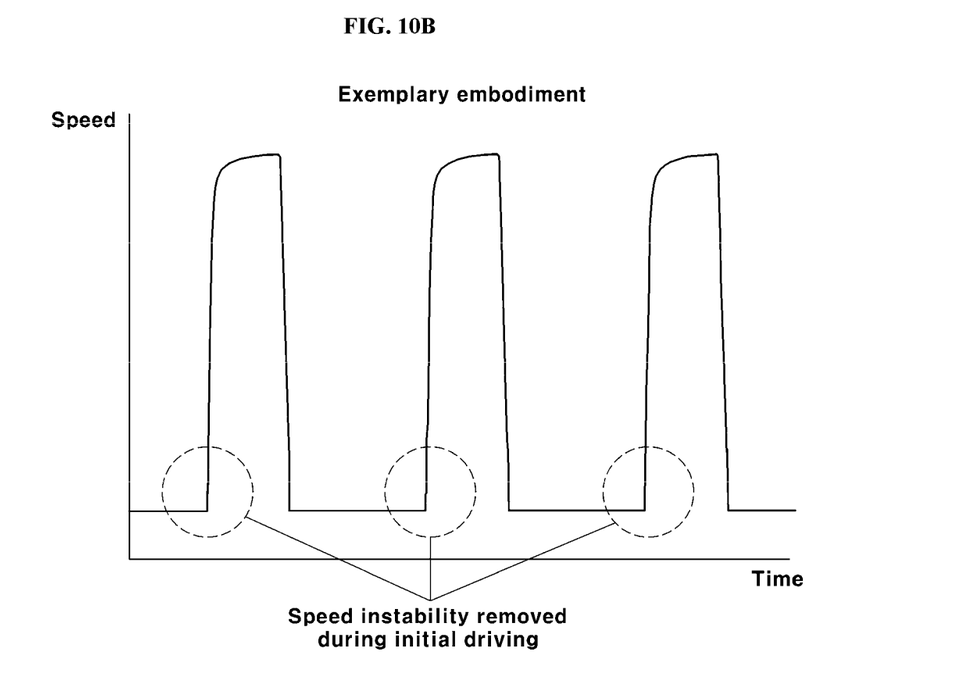

FIG. 10A and FIG. 10B are diagrams illustrating a comparison of a speed graph of a comparative example and an exemplary embodiment of the present invention. The comparative example shown in FIG. 10A is an example in which sensorless control is performed immediately upon resuming the motor without performing rotor position alignment when the motor is stopped. The exemplary embodiment shown in FIG. 10B illustrates an example of control according to an exemplary embodiment of the present invention.

As shown, in the comparative example, speed instability occurs in the initial stage of driving when the motor is resumed after the motor is stopped, but in the case of the exemplary embodiment of the present invention, stable speed control is achieved without speed instability.

Thus, in accordance with the sensorless motor control method of the air compressor according to an exemplary embodiment of the present invention, the initial speed control responsiveness of the driving of the air compressor may be improved, and thus the air supply responsiveness of the fuel cell stack, the stack output responsiveness, and vehicle acceleration performance may be improved.

Furthermore, when the driving is resumed after the motor is stopped, the speed control stability of the initial driving is ensured to avoid the application of torque to a meaningless position, improving the efficiency of the driving of the motor and improving the vehicle fuel efficiency.

Furthermore, the term "controller" refers to a hardware device including a memory and a processor configured to execute one or more steps interpreted as an algorithm structure. The memory may be a non-transitory storage medium including program instructions which store algorithm steps, and the processor executes the algorithm steps to perform one or more processes of a method in accordance with various exemplary embodiments of the present invention. The controller according to exemplary embodiments of the present invention may be implemented through a non-volatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a sensorless motor, the method comprising:
   performing, by a controller, a speed control for stopping the motor;
   determining, by the controller, a motor stopped state from an estimated motor speed according to a sensorless control logic while the speed control is performed by the controller;
   determining, by the controller, a rotor position of the motor estimated by the sensorless control logic as a fixed position at a time of determining the motor stopped state;
   performing, by the controller, a motor position control to move the rotor position to the fixed position when the motor stopped state is determined by the controller; and
   starting, by the controller, a sensorless control for driving the motor with the fixed position taken as an initial position when requesting the driving the motor in a state in which the rotor position of the motor is maintained at the fixed position by the controller,
   wherein, in the performing the motor position control, the controller is configured to apply q-axis current to the motor configured for moving the rotor position of the motor to the fixed position.

2. The method of claim 1, wherein the controller is configured to determine the motor stopped state upon determining that the estimated motor speed reaches or falls below a reference speed predetermined according to the sensorless control logic in the determining the motor stopped state.

3. The method of claim 2, wherein the reference speed is set to the controller at a speed greater than 0 rpm.

4. The method of claim 1, wherein, in the performing the motor position control, the controller is configured to stop an application of the q-axis current upon determining that a predetermined reference time elapses after starting applying the q-axis current.

5. The method of claim 4, wherein, in the performing the motor position control, the controller is configured to check whether a speed command of the motor is 0 rpm, and the q-axis current is applied when the reference time elapses while the speed command of the motor is 0 rpm.

6. The method of claim 4, wherein the controller is configured to generate and outputs a PWM signal to apply the q-axis current to the motor, and stops generating and outputting the PWM signal when the reference time elapses.

7. The method of claim 1, wherein the motor is mounted in an air compressor.

8. The method of claim 7, wherein the air compressor is an air compressor for a fuel cell system of supplying air to a fuel cell stack.

9. The method of claim 1, wherein the controller includes:
   a processor; and
   a non-transitory storage medium on which a program for performing the method of claim 1 is recorded and executed by the processor.

10. A non-transitory computer readable medium on which a program for performing the method of claim 1 is recorded.

* * * * *